United States Patent
Conrad

(10) Patent No.: US 8,966,814 B2
(45) Date of Patent: *Mar. 3, 2015

(54) CAST PELLETS FOR PLANTING SEEDS

(75) Inventor: Robert Conrad, Wheaton, IL (US)

(73) Assignee: Ball Horticultural Company, West Chicago, IL (US)

( * ) Notice: Subject to any disclaimer, the term of this patent is extended or adjusted under 35 U.S.C. 154(b) by 232 days.

This patent is subject to a terminal disclaimer.

(21) Appl. No.: 13/316,124

(22) Filed: Dec. 9, 2011

(65) Prior Publication Data

US 2012/0084888 A1 Apr. 5, 2012

Related U.S. Application Data

(63) Continuation-in-part of application No. 13/076,791, filed on Mar. 31, 2011.

(60) Provisional application No. 61/320,229, filed on Apr. 1, 2010.

(51) Int. Cl.
*A01C 1/06* (2006.01)
*A01G 1/00* (2006.01)

(52) U.S. Cl.
CPC .. *A01C 1/06* (2013.01); *A01G 1/001* (2013.01)
USPC .............. 47/58.1 R; 47/58.1 SE; 47/57.6

(58) Field of Classification Search
CPC ........................................................ A01G 1/001
USPC ............................ 47/57.6, 58.1 R, 58.1 SE, 6
See application file for complete search history.

(56) References Cited

U.S. PATENT DOCUMENTS

| | | | |
|---|---|---|---|
| 3,499,748 A | | 3/1970 | Fraser |
| 3,698,133 A | | 10/1972 | Schreiber |
| 3,973,355 A | * | 8/1976 | McKenzie ................. 47/59 R |
| 4,493,162 A | | 1/1985 | Langan et al. |
| 4,583,320 A | * | 4/1986 | Redenbaugh ............. 47/57.6 |
| 4,665,648 A | * | 5/1987 | Branco et al. .............. 47/57.6 |
| 4,735,017 A | * | 4/1988 | Gago et al. ................. 47/57.6 |
| 4,914,858 A | * | 4/1990 | Nijssen et al. .......... 47/1.01 R |
| 5,087,475 A | * | 2/1992 | Bazin et al. ................... 427/4 |
| 5,232,465 A | * | 8/1993 | White et al. .............. 47/58.1 R |
| 5,623,781 A | | 4/1997 | Legro |
| 6,242,384 B1 | * | 6/2001 | Lamattina et al. ........... 504/187 |
| 7,472,661 B2 | | 1/2009 | Hull et al. |

(Continued)

FOREIGN PATENT DOCUMENTS

| | | |
|---|---|---|
| EP | 0010630 | 5/1982 |
| GB | 1266551 | 3/1972 |

(Continued)

OTHER PUBLICATIONS

Evans et al "Starting plants from seeds" Horticulture Information Leaflet 8703, Jan. 1999, 5 pages.*

*Primary Examiner* — Monica Williams
(74) *Attorney, Agent, or Firm* — Clayton Howarth & Cannon, P.C.

(57) ABSTRACT

A multi-plant product and a method of producing a container of plants are described. Cast pellets containing plant seeds selected for their seed germination timing are planted in a container with a vegetative cutting. The cutting can be selected for having root initiation timing synchronized with the seed germination timing of the plant seeds in the cast pellet. The seed germination timing of the plant seeds can be modified by selecting the volume of the cast pellet.

21 Claims, 2 Drawing Sheets

(56) References Cited

U.S. PATENT DOCUMENTS

| | | |
|---|---|---|
| 7,891,134 B2 | 2/2011 | Wismans |
| 2002/0066227 A1 | 6/2002 | Wood-Phillips |
| 2002/0134012 A1 | 9/2002 | Ding et al. |
| 2006/0032120 A1* | 2/2006 | McPherson .................. 47/57.6 |
| 2006/0150489 A1 | 7/2006 | Legro et al. |
| 2006/0265952 A1* | 11/2006 | Christal ........................ 47/65.7 |
| 2007/0251144 A1* | 11/2007 | Cooley .............................. 47/77 |
| 2008/0202026 A1* | 8/2008 | Bong Kyun ...................... 47/56 |
| 2010/0263274 A1* | 10/2010 | Corak et al. ................. 47/57.6 |
| 2011/0039694 A1* | 2/2011 | Rosa et al. ................... 504/100 |
| 2011/0138689 A1 | 6/2011 | Wismans |
| 2011/0239535 A1* | 10/2011 | Conrad ......................... 47/57.6 |
| 2012/0084888 A1* | 4/2012 | Conrad ......................... 800/298 |

FOREIGN PATENT DOCUMENTS

| | | |
|---|---|---|
| JP | 4356131 | 9/1992 |
| WO | 2007/100251 | 9/2007 |
| WO | 2009/027393 | 3/2009 |
| WO | 2009/139631 | 11/2009 |

* cited by examiner

CAST PELLETS FOR PLANTING SEEDS

CROSS-REFERENCE TO RELATED APPLICATIONS

This application is a continuation-in-part of U.S. application Ser. No. 13/076,791, filed Mar. 31, 2011, which claims the benefit of U.S. Provisional Application No. 61/320,229, filed Apr. 1, 2010, both of which are hereby incorporated by reference herein in their entireties, including but not limited to those portions that specifically appear hereinafter, the incorporation by reference being made with the following exception: In the event that any portions of the above-referenced applications are inconsistent with this application, this application supercedes the above-referenced applications.

STATEMENT REGARDING FEDERALLY SPONSORED RESEARCH OR DEVELOPMENT

Not applicable.

It has long been common practice to "pellet" or "coat" seeds of various types to facilitate the sowing process. Typically, growers want to place a single seed in a specific location, hence they may use sowing equipment to select a single coated or pelleted seed for placement. Thus, most coated or pelleted seeds contains a single seed. Sowing can be done directly in a field, as with agronomic and some vegetable crops, or into containers in greenhouses, as in flower and some vegetable crops.

In some circumstances, it is desired to have more than a single seedling growing in close proximity to others. Examples include some ornamental species being grown as young plants for subsequent transplanting to larger containers ("plugs"). In these species, plugs reach a transplantable stage earlier, and result in a better finished product, if there are multiple seedlings growing in the same individual plug cell.

One way to achieve multiple seedlings growing in close proximity to others is to sow multiple seeds in close proximity. In the case of plug production, this requires picking up multiple seeds and placing them in the same plug cell, either at one time (via multiple orifices in the sowing machine) or by passing the plug tray through the sowing line multiple times.

Another way to achieve multiple seedlings growing in close proximity to others is to include multiple seeds in a single pellet or coated seed product. This approach is advantageous in that the same sowing equipment can be used as for sowing single seeds, and the plug tray need only pass through the sowing line one time. Indeed, over time, multiseed pellets of certain species have become the predominant form in the market.

In those species where single seed germination rates are unacceptably low, and where the presence of more than a single seedling in the plug cell does not negatively affect performance, multiseed pellets have been used. For example, multiseed pellets containing two seeds from a seed lot with a 60% germination rate will result in germination of one or two seedlings in 84% of plug cells. Thus, more recently, multiseed pellets have been used to provide a higher germinating product to the market compared to single seed pellets.

While production of single seed pellets involves great care to assure that all pellets contain only one seed, production of multiseed pellets typically uses contrasting techniques. Seeds are placed in rotating drums or rotary coaters, and adhesives are applied by spray or dripping. The adhesives cause seeds to bind together to form aggregates. Typically, aggregates will form of different sizes, the size of the aggregate generally being proportional to the number of seeds in the aggregate. Aggregate size can be controlled by rate of rotation of the drum or disc, rate of application of adhesive, selection of adhesive, and/or by passing aggregates through screens with various sized openings. Aggregates, either with or without drying, can then be pelleted, serving as the nucleus or core of a pellet, just as a single seed serves as the nucleus or core of a single seed pellet.

In many ornamental species, it is advantageous to have a mixture of plants, rather than many of the same plant, grown in proximity with one another. For many ornamental plants grown for their foliage or flower color, up to 50% of all sales in the market are color mixes versus individual colors. For these species typically propagated from seed, seeds from varieties with different foliage or flower colors are typically mixed, then sown and grown similarly as for individual colors. The final result at the retail outlet is a group of finished containers, each containing an individual plant of a single color. Collectively the group of finished containers represent the original seed mix.

With the development of multiseed pellets, an alternative approach was available. Seeds of varieties with different foliage or flower colors could be mixed, then this mixture could be used to produce multiseed pellets. The individual aggregates and individual multiseed pellets produced using this concept could have more than one color of the mix. Hence, the individual plugs and individual finished containers produced according to this concept could have more than one color of the mix.

In recent years, container gardening has become more popular. Instead of selling ornamental plant products designed to be transplanted into soil in flower beds, plants are grown in larger containers, hanging baskets, and so forth, and sold to consumers to be displayed as is, without further transplanting. A significant portion of this market involves "mixed containers," where more than one color of a species or more than one species are present in the container. A similar trend can be seen with some edible plants, where multiple herbs or salad components are sold growing in the same container. Typically, these mixed containers are produced by growers by transplanting young plants, or plugs, of selected species into the same container, then growing the mixed plants until they reach a saleable stage.

An alternative to transplanting multiple plugs of a single plant into a mixed container would be to directly sow a multiseed pellet, or transplant a plug produced from a multiseed pellet into the mixed container. Multiseed pellets containing seeds of different colors of the same species have been on the market, but the color composition of each individual multiseed pellet, and hence each plug grown from a multiseed pellet, cannot be controlled. The aggregation step in the multiseed pellet production process described above is random as to which seeds aggregate together. This process cannot result in predictable and reproducible color combinations within a single multiseed pellet.

Direct sowing of a multiseed pellet, or transplanting of a plug produced from a multiseed pellet into a mixed container designed to contain multiple species would be highly desirable. While a limited number of such products have been introduced to the market, these multispecies multiseed pellets have similar limitations to single species multiseed pellets, namely, insufficient controllability of the composition of individual multiseed pellets. Differences in seed size, shape, density, and surface can be used during the multispecies multipellet production process to make the composition of each individual multipellet less random, as can techniques employed during the multipellet production process, such as adhesive selection, rate of adhesive application, rate of pan or disc rotation, and so forth. However, no existing techniques or processes have resulted in multiseed pellets of sufficiently controlled composition.

An illustrative embodiment of the present invention comprises a composition comprising a mixture of one or more plant seeds and a setable, flowable casting substance wherein the mixture is configured as a cast pellet. In one illustrative embodiment, the casting substance comprises a water-soluble thermoplastic. Illustratively, the thermoplastic can comprise polyethylene glycol, such as polyethylene glycol having a molecular weight of about 1,500 to about 20,000. Typically, the thermoplastic has a glass transition temperature of 35.0° C. or higher, and may also have a melting temperature of 65.6° C. or lower. In other illustrative embodiments, the casting substance comprises plaster, polyacrylamide or a derivative thereof, polyacrylic acid, a melt processable starch, a hard fat, a wax, polyvinyl alcohol, glycerides, or partial glycerides, or mixtures thereof. In another illustrative embodiment the pellet comprises at least two plant seeds. The at least two plant seeds can comprise seeds of one variety, or at least two different varieties of the same species, or at least two different species. The one or more plant seeds can be untreated, coated, pelleted, treated, primed, or mixtures thereof. In still another illustrative embodiment, the mixture can further comprise a filler. The filler can be inert, such as sand or clay, or the filler can possess functionality, such as the ability to modify the water solubility, permeability, color, or rheological properties of the cast pellet. Further yet, the mixture can comprise one or more plant growth regulators, insecticides, fungicides, bactericides, fertilizers, microorganisms, or mixtures thereof; or a dummy pellet or smart pill. In yet another illustrative embodiment, the composition can further comprise an overcoating disposed on the cast pellet.

Another illustrative embodiment of the present invention comprises a method of making a cast pellet, the method comprising:

(a) placing in a mold a mixture of one or more plant seeds and a setable, flowable casting substance in a flowable state; and (b) causing the casting substance to set to result in the cast pellet.

In this method, the casting substance can comprise a water-soluble thermoplastic. Illustratively, the thermoplastic can comprise polyethylene glycol, such as polyethylene glycol having a molecular weight of about 1,500 to about 20,000. Typically, the thermoplastic has a glass transition temperature of 35.0° C. or higher, and may also have a melting temperature of 65.6° C. or lower. In other illustrative embodiments of the method, the casting substance can comprise plaster, polyacrylamide or a derivative thereof, polyacrylic acid, a melt processable starch, a hard fat, a wax, polyvinyl alcohol, glycerides, or partial glycerides, or mixtures thereof. In another illustrative embodiment of the method, the pellet can comprise at least two plant seeds. The at least two plant seeds can comprise seeds of one variety, or at least two different varieties of the same species, or at least two different species. The one or more plant seeds can be untreated, coated, pelleted, treated, primed, or mixtures thereof. In still another illustrative embodiment of the method, the mixture can further comprise a filler. The filler can be inert, such as sand or clay, or the filler can possess functionality, such as the ability to modify the water solubility, permeability, color, or rheological properties of the cast pellet. Further yet, the mixture can comprise one or more plant growth regulators, insecticides, fungicides, bactericides, fertilizers, microorganisms, or mixtures thereof; or a dummy pellet or smart pill. In yet another illustrative embodiment of the method, the cast pellet can further comprise an overcoating disposed thereon.

Another illustrative embodiment of the invention comprises a method of producing a multi-plant product, the method comprising planting in a container (a) a cast pellet comprising a mixture of one or more plant seeds and a setable, flowable casting substance, and (b) an unrooted plant cutting. The one or more plant seeds can be selected for their seed germination timing, and the unrooted plant cutting can be selected for having root initiation timing synchronized with the seed germination timing of the one or more plant seeds.

Still another illustrative embodiment of the invention comprises a product comprising (a) a cast pellet comprising a mixture of one or more plant seeds and a setable, flowable casting substance, and (b) at least one unrooted plant cutting. The one or more plant seeds can be selected for their seed germination timing, and the unrooted plant cutting can be selected for having root initiation timing synchronized with the seed germination timing of the one or more plant seeds. The product can further comprise a container in which the product is received. The seed germination timing is modified by selecting a volume of the cast pellet.

Yet another illustrative embodiment of the invention comprises a multi-plant product comprising a plurality of plants of different varieties or different species grown from the product described in the previous paragraph.

DETAILED DESCRIPTION

Figure 1:
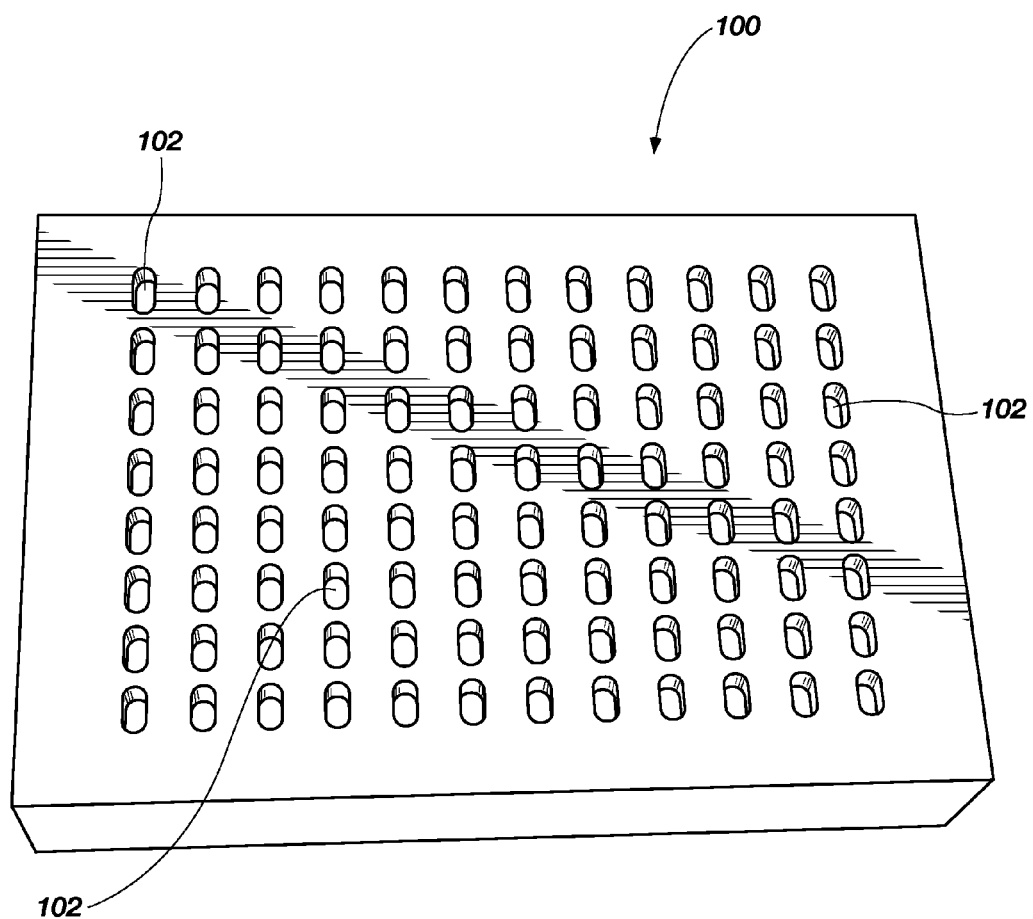
FIG. 1 shows an illustrative mold for casting pellets according to the present invention.

Before the present cast pellets and methods are disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

The publications and other reference materials referred to herein to describe the background of the invention and to provide additional detail regarding its practice are hereby incorporated by reference. The references discussed herein are provided solely for their disclosure prior to the filing date of the present application. Nothing herein is to be construed as an admission that the inventors are not entitled to antedate such disclosure by virtue of prior invention.

It must be noted that, as used in this specification and the appended claims, the singular forms "a," "an," and "the" include plural referents unless the context clearly dictates otherwise.

Unless defined otherwise, all technical and scientific terms used herein have the same meanings as commonly understood by one of ordinary skill in the art to which this invention belongs.

In describing and claiming the present invention, the following terminology will be used in accordance with the definitions set out below.

As used herein, "comprising," "including," "containing," "characterized by," and grammatical equivalents thereof are inclusive or open-ended terms that do not exclude additional, unrecited elements or method steps. "Comprising" is to be interpreted as including the more restrictive terms "consisting of" and "consisting essentially of."

As used herein, "consisting of" and grammatical equivalents thereof exclude any element, step, or ingredient not specified in the claim.

As used herein, "consisting essentially of" and grammatical equivalents thereof limit the scope of a claim to the specified materials or steps and those that do not materially affect the basic and novel characteristic or characteristics of the claimed invention.

Thermoplastics, also known as thermosoftening plastics, are polymers that liquify when heated and freeze into glassy states when cooled. Thermoplastics can be remelted and remolded by raising and lowering the temperature. A thermoplastic is elastic and flexible above its glass transition temperature ($T_g$). Below its melting temperature ($T_m$), which is higher than the glass transition temperature, a thermoplastic generally has crystalline regions alternating with amorphous regions in which the polymer chains approximate random coils. Above the melting temperature all crystalline structure disappears and the chains become randomly interdispersed. As the temperature increases above the melting temperature, viscosity decreases without any distinct phase change. Thermoplastic at http://en.wikipedia.org/wiki/Thermoplastic (Mar. 22, 2010).

FIG. 1 shows an illustrative mold for making cast pellets according to the present invention. The mold 100 comprises multiple cavities 102 formed therein. The cavities 102 can be formed in any shape, but shapes that result in cast pellets that can be sown with conventional sowing equipment are advantageous.

The mold for making cast pellets can be made of any suitable material. For example, an illustrative material for making molds is AMAZING MOLD PUTTY (Amazing Crafting Products/Alumilite Corporation, Kalamazoo, Mich.), a platinum-based silicon mold rubber. This material is flexible, which facilitates removal of the solidified castings. The layout or configuration of the cavities or cells can vary widely. It is desirable for the layout of cavities to match the layout of the sowing device. For example, a typical sowing machine for plug trays with 512 cells in a 11×22 inch (28.2× 56.3 cm) layout can be used without modification if the mold is configured with 512 cavities in the same footprint. The volume of the cavity should be large enough to accommodate all of the seeds selected in each pellet, yet small enough for the pellet to be sown using conventional sowing machines.

The shape of the cavities in the mold can vary. A cube or cuboid shape is easily done, but presents all flat surfaces without any rounded surfaces. In one illustrative embodiment of the present invention, cavities were shaped like half a gel capsule, split along the long axis. This resulted in cast pellets with one rounded surface along a portion of it's long axis, rounded surfaces on both ends, and a flat surface along the remaining portion of it's long axis. A hemisphere shape is also easily produced. If only rounded surfaces are desired, two-part molds can be used by filling the bottom mold portion with seeds, placing the top mold portion over the bottom mold portion, and injecting the molten material into the void. Alternatively, squared or flat surfaces can be rounded by tumbling them in a rotating pan. Increasing temperature above room temperature would make the castings softer and facilitate rounding.

Figure 2:
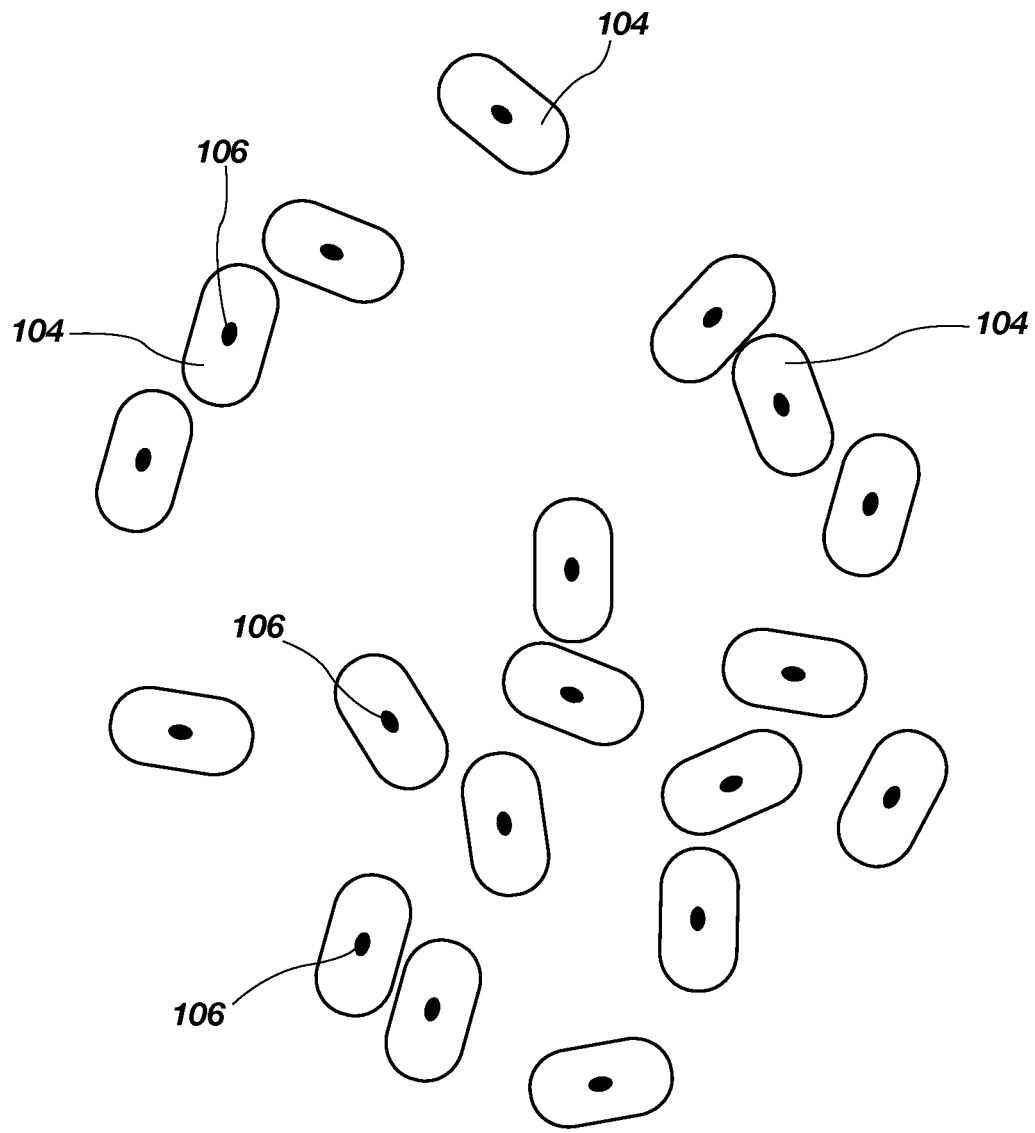
FIG. 2 shows illustrative cast pellets according to the present invention.

One or more seeds and a molten composition comprising a water-soluble thermoplastic are placed in the cavities 102 of the mold 100. The seeds and molten composition can be mixed in the cavities 102, or can be mixed prior to placement in the cavities 102. The molten composition is then cooled such that the thermoplastic solidifies to result in the cast pellets. FIG. 2 shows illustrative cast pellets 104 containing seeds 106.

According to the present invention, the water-soluble thermoplastic would ordinarily be a solid at temperatures likely to be encountered during storage, packaging, shipping, and sowing (approximately less than 95° F. or 35.0° C.). Thus, the glass transition temperature for a suitable thermoplastic is about 95° F. (35.0° C.) or higher. Further, the thermoplastic would ordinarily be liquid at a temperature that will not injure seeds (approximately less than 150° F. or 65.6° C.). Thus, the melting temperature for a suitable thermoplastic is typically about 150° F. (65.6° C.) or lower.

The water-soluble thermoplastic should not have a high density or viscosity when molten so that seeds float on the molten thermoplastic. Rather, the water-soluble thermoplastic should be sufficiently free-flowing while molten to occupy the voids around seeds in the mold cavity. Further, the water soluble thermoplastic should be sufficiently water soluble, or water permeable, to allow seeds to imbibe water and to germinate.

In addition to thermoplastics, other casting substances can be utilized to make the cast pellets. Suitable materials should be sufficiently free-flowing, so that voids around the seeds in the cavity are filled, should become rigid via mechanisms such as changes in temperature or a chemical reaction, and should dissolve, shatter, or disaggregate after sowing to allow seeds to imbibe water and to germinate. Additional flowable casting substances include but are not limited to plaster, polyacrylamide and its derivatives, melt processable starches, hard fats, waxes, polyvinyl alcohols, glycerides, and partial glycerides. Combinations of flowable casting substances can be utilized. Combinations include but are not limited to waxes with glycerides, and polyacrylamide with polyvinyl alcohols.

Thermoplastic materials undergo a phase change due to temperature, being flowable in a liquid phase at elevated temperatures and solid at a lower temperature. Water soluble thermoplastics dissolve after sowing, leaving seeds exposed to germinate. Similarly, plaster can be used, as it is flowable in a liquid phase, solidifies due to a chemical reaction, and dissolves after sowing. In addition, polyacrylamide and its derivatives including polyacrylic acid are flowable at high pH, become rigid at a low pH. Raising the pH after sowing would allow the polyacrylic acid to transform to a very low viscosity, allowing the seeds to germinate. Melt processable starches, as described in U.S. application Ser. No. 12/266, 057, also have suitable melt viscosity to function as casting substances.

Seeds can be placed into the mold cavities using any of a number of approaches including manually, with a vacuum plate, or with any commercially available seeding device. Seeds being placed can be raw seeds, coated, pelleted, treated, primed, or any form normally sown into media or soil.

Various inert fillers can be included in the cast pellets to reduce cost, change density, change color, contribute to rheological changes, or to influence water permeability or absorption. Illustrative examples of such fillers include sand, clays, and the like.

Cast pellets according the present invention can be overcoated with materials to improve flowability through sowing equipment, change colors, and the like. The processes for overcoating cast pellets may be the same or similar to those use for overcoating seeds, as is well known in the art.

Any material currently used to treat seeds can be envisioned as being included in the cast pellets according to the present invention. By diluting the active ingredient in the volume of the cavity, less deleterious phytotoxic effects may be observed compared to the traditional manner of concentrating the active ingredient on the seed surface. Active ingredients can be introduced to the cast pellets directly by suspending them in the molten water-soluble thermoplastic, or by delivering a capsule, granule, smart pill (dummy pellet), or the like to the cavity in the same manner as a seed.

When using a cast pellet comprising a water-soluble thermoplastic, the cast pellet dissolves upon watering after sowing, leaving the one or more seeds and anything included in the cavity in proximity to the one or more seeds. Thus, any materials that could be beneficial by being in close proximity to seeds are candidates for inclusion into the cast pellet. Illustrative examples include insecticides, fungicides, bactericides, plant growth regulators, fertilizers, and microorganisms.

According to the present invention, a person of ordinary skill in the art can precisely and reproducibly control the composition of each cast pellet. For example, the number of seeds of a single variety can be adjusted to result in a specified range of number of seedlings based on the germination rate of the starting seed lot. As another example, the desired color mix of a single species within each individual cast pellet can be achieved. As still another example, the desired mix of different species within each individual cast pellet can also be achieved. Further, one can easily and reproducibly adjust the composition of the cast pellet from one production batch to another regarding each of the characteristics mentioned above. The result is a cast pellet that can be handled, stored, packaged, shipped, sown, and germinated like regular seed. The cast pellet can also serve as a carrier for biologically active materials, such as fungicides, insecticides, plant growth regulators, nutrients, and the like.

When making the cast pellets, each cavity or cell the mold should have a sufficient volume to contain the desired mixture of thermoplastic, seeds, and other optional ingredients. The volume of each cavity or cell is independent of the layout, configuration, and/or dimensions of the mold. The layout, configuration, and/or dimensions of the mold can be varied to suit the method of placement of the seeds in the mold, as described more fully below.

Placement of seeds in the mold can be by any known method, such as by hand or by the use of known seed sowing devices, such as vacuum plate, drum seeder, needle seeder, belt seeder, cone seeder, and the like. The seeds placed in each cavity or cell of the mold can be raw (untreated) seeds, coated seeds, pelleted seeds, primed seeds, treated seeds, and the like. This process of placing seeds in the cavities of the mold can be repeated with seeds of other species, colors, and so forth, until a selected mixture is obtained. The water-soluble thermoplastic in a liquid state can be added to the mold to fill each cavity or cell so that the void space among the seeds is filled. After filling, the liquid thermoplastic is allowed to cool and solidify. The resulting solidified cast pellets of known composition can then be removed from the mold.

Example 1

Multiseed Studies

Four seeds of selected varieties were placed in every mold cavity of a mold containing 108 cavities of dimension of 0.25 inch (6.4 mm) in length by 0.125 inch (3.2 mm) in width and 0.125 inch (3.2 mm) in depth. Polyethylene glycol with a molecular weight of 2000 (PEG 2000) was heated to 111° F. until the PEG 2000 completely melted, the 65 µl of molten PEG 2000 was pipetted into the cavities containing the seeds. Once the entire mold was filled it was set aside to cool. The castings were then removed from the mold.

The 108 castings (seed plus PEG 2000) and production multipelleted control were sown in a plug tray to evaluate germination. Seeds were sown at either 25° C. or 20° C., depending on the seed crop sown. The plug trays were run through a watering tunnel and then put into a Stage 1 mist chamber. Upon radical emergence, the plugs were placed in a Stage 2 chamber. The amount of time in Stage 1 and Stage 2 was dependent on the selected crop. Germination results are presented in Table 1.

TABLE 1

| Crop | Variety | Stage 1 Days | Stage 2 Days | Germ Temp | Count Date | Multipelleted Control Germ (%) | Multipelleted Casting Germ (%) |
|---|---|---|---|---|---|---|---|
| *Alyssum* | Crystals White | 3 | 13 | 25° C. | 16 | 99 | 100 |
| *Portulacea* | Margarita Orange | 2 | 14 | 25° C. | 16 | 96 | 99 |

These data show that this method of producing cast multiseed pellets gives germination results comparable to traditional multiseed pellets.

Example 2

Single Seed Raw Versus Cast

A single seed was placed in every mold cavity of a mold containing 108 cavities of dimension of 0.25 inch (6.4 mm) in length by 0.125 inch (3.2 mm) in width and 0.125 inch (3.2 mm) in depth. PEG 2000 was heated to 111° F. until the PEG 2000 completely melted, then 65 µl of molten PEG 2000 was pipetted into the cavities containing the seeds. Once the entire mold was filled it was set aside to cool. The castings were then removed from the mold.

The 108 castings (seed plus PEG 2000), along with a raw control, were sown in a plug tray to evaluate germination. Seeds were sown at either 25° C. or 20° C., depending on the seed crop sown. The plug trays were run through a watering tunnel and then put into a Stage 1 mist chamber. Upon radical emergence, the plugs were placed in a Stage 2 chamber. The amount of time in Stage 1 and Stage 2 was dependent on crop. Germination results are presented in Table 2.

TABLE 2

| Crop | Variety | Stage 1 Days | Stage 2 Days | Germ Temp | Count Date | Raw Germ (%) | Casting Germ (%) |
|---|---|---|---|---|---|---|---|
| *Impatiens* | Dazzler White | 4 | 2 | 25° C. | 6 | 97 | 98 |
| *Pansy* | Majestic Giant II Yellow Blotch | 5 | 10 | 20° C. | 15 | 76 | 81 |
| *Petunia* | Madness Red | 3 | 5 | 25° C. | 8 | 78 | 63 |
| *Echinacea* | Purple | 5 | 24 | 25° C. | 29 | 72 | 70 |
| Lettuce | Simpson Elite | 2 | 8 | 20° C. | 10 | 94 | 95 |
| Tomato | Early Girl | 3 | 8 | 25° C. | 10 | 100 | 100 |
| Pepper | Lady Bell | 2 | 8 | 25° C. | 10 | 100 | 100 |
| *Portulacea* | Margarita Orange | 3 | 5 | 25° C. | 8 | 82 | 79 |

These data show that seeds inside these castings germinate comparably to the same seeds sown without the castings.

Example 3

Multiple Melt Sources

A single seed was placed in every mold cavity of a mold containing 108 cavities of dimension of 0.25 inch (6.4 mm) in length by 0.125 inch (3.2 mm) in width and 0.125 inch (3.2 mm) in depth. PEG 2000, PEG 4000, PEG 8000, and Gelucire® 43 (glycerol esters of saturated C12-C18 fatty acids) were heated until completely melted, then 65 μl of molten water soluble thermoplastic was pipetted into the cavities containing the seeds. All of the PEGs melted at 145° C. or below, and the Gelucire® 43 at about 104° C. Once the entire mold was filled it was set aside to cool. The castings were then removed from the mold.

The 108 castings (seed plus water-soluble thermoplastic), along with a raw control, were sown in a plug tray to evaluate germination. Seeds were sown at either 25° C. or 20° C., depending on the seed crop sown. The plug trays were run through a watering tunnel and then put into a Stage 1 mist chamber. Upon radical emergence, the plugs were placed in a Stage 2 chamber. The amount of time in Stage 1 and Stage 2 was dependent upon crop. Germination results are presented in Table 3.

These data show that different water-soluble materials can be used to make cast multiseed pellets.

Example 4

Filler in Cast

A single seed was placed in every mold cavity of a mold containing 108 cavities of dimension of 0.25 inch (6.4 mm) in length by 0.125 inch (3.2 mm) in width and 0.125 inch (3.2 mm) in depth. PEG 2000 was heated to 111° F. until the PEG 2000 completely melted. Fillers were added to the melted PEG, and the resulting mixture was stirred on a hot plate until completely mixed. Two kinds of fillers were added: clay and sand. One casting mixture was made up of 10% Celite (clay), and the second casting mixture was made of 5% Sylox (sand). A third casting was made without any fillers. After preparation of the mixtures, 65 μl was pipetted into the cavity that contained the seeds. Once the selected number of molds were filled it, they were set aside to cool. The castings were then removed from the mold.

The 108 castings (seed plus PEG 2000, with and without fillers) and a raw control were sown in a 108-plug flat to evaluate germination. Seeds were sown at either 25° C. or 20° C., depending on the seed crop sown. The plug trays were run through a watering tunnel and then put into a Stage 1 mist chamber. Upon radical emergence, the plugs were placed in a Stage 2 chamber. The amount of time in Stage 1 and Stage 2 was dependent on the crop.

Seeds that were pelleted and/or coated by production methods were also cast and sown in the 108 plug flats. The production pelleted or coated controls were also sown with the casting of the pelleted or coated seeds. Germination results are presented in Table 4.

TABLE 3

| Crop | Variety | Treatment | Stage 1 Days | Stage 2 Days | Germ Temp | Count Date | Germ (%) |
|---|---|---|---|---|---|---|---|
| *Impatiens* | Dazzler White | Raw | 4 | 5 | 25° C. | 9 | 100 |
| | | PEG 2000 | 4 | 5 | 25° C. | 9 | 82 |
| | | PEG 4000 | 4 | 5 | 25° C. | 9 | 66 |
| | | PEG 8000 | 4 | 5 | 25° C. | 9 | 99 |
| | | Wax | 4 | 5 | 25° C. | 9 | 56 |
| Panola | Golden Yellow | Raw | 5 | 7 | 20° C. | 12 | 80 |
| | | PEG 2000 | 5 | 7 | 20° C. | 12 | 69 |
| | | PEG 4000 | 5 | 7 | 20° C. | 12 | 94 |
| | | PEG 8000 | 5 | 7 | 20° C. | 12 | 87 |
| | | Wax | 5 | 7 | 20° C. | 12 | 70 |

TABLE 4

| Crop | Variety | Treatment | Stage 1 Days | Stage 2 Days | Germ Temp | Count Date | Raw Germ (%) |
|---|---|---|---|---|---|---|---|
| Petunia | Madness Red | Raw | 3 | | 25° C. | 13 | 96 |
| | | Cast only | | | | | 88 |
| | | w/Clay Cast | | | | | 94 |
| | | w/Sand Cast | | | | | 84 |
| Pelleted Petunia | Madness Red | Pelleted Raw | 3 | | 25° C. | 15 | 100 |
| | | Pellet/Cast | | | | | 93 |
| Pelleted Snapdragons | Rocket Cherry | Pelleted Raw | 3 | | 25° C. | 20 | 85 |
| | | Pellet/Cast | | | | | 48 |
| Coated Impatiens | Dazzler White | Coated Raw | 4 | | 25° C. | 14 | 99 |
| | | Coated/Cast | | | | | 82 |

These data show that fillers or extenders can be added to change the properties of the cast multiseed pellets. In addition, the seeds need not be raw (untreated) seeds. Coated or pelleted single seeds can also be sown in the cavities or cells.

Example 5

Seed Applied Additives

It is common to use seed treatment as a delivery vehicle for various biologically active materials. For example, seeds are commonly treated with fungicides to prevent fungal diseases and with insecticides to protect against insect damage. Similarly, seeds can be treated with plant growth regulators as an alternative to drench or spray application to prevent seedling stretching.

A single seed was placed in every mold cavity of a mold containing 108 cavities of dimensions 0.25 inch (6.4 mm) in length by 0.125 inch (3.2 mm) in width and 0.125 inch (3.2 mm) in depth. The following growth regulator concentrations were applied to seed via the casting method: 2 ppm, 4 ppm, and 8 ppm. PEG 4000 (100 g) was weighed out and put into a beaker. This was done four times. Each beaker with the PEG 4000 was heated to 111° F. until the PEG 4000 completely melted. The growth regulator concentrations were made by dissolving a given weight of the plant grown retardant ancymidol ($\alpha$-cyclopropyl-$\alpha$-(p-methoxyphenyl)-5-pyrimidinemethanol; A-REST) powder into 1 ml of acetone, as follows: 6.4 mg A-REST into 1 ml of acetone for 2 ppm; 12.8 mg A-REST into 1 ml of acetone for 4 ppm; and 25.6 mg A-REST into 1 ml acetone for 8 ppm. Once dissolved, the specified concentrations of A-REST were added to the beakers with the melted PEG and mixed on the heated stir plate until well blended; 65 μl was pipetted into the cavities that contained the seeds. Once the entire mold was filled it was set aside to cool. This process was repeated for each of the A-REST concentrations and the cast control that did not contain any A-REST. The castings were then removed from the mold.

The 108 castings (seed plus PEG 4000) containing the A-REST concentrations, along with a cast only (no added A-REST) and a raw control, were sown in a plug tray to evaluate germination. Seeds were sown at 25° C. The plug trays were run through a watering tunnel and then put into a Stage 1 mist chamber. Upon radical emergence, the plugs were placed in a Stage 2 chamber. The amount of time in Stage 1 and Stage 2 was dependent on the crop.

Plant height was measured and recorded on the same day seed germination was recorded. Results are presented in Table 5.

TABLE 5

| Crop | Variety | Treatment | Stage 1 Days | Stage 2 Days | Germ Temp | Count Date | Germ (%) | Ave. Height (mm) |
|---|---|---|---|---|---|---|---|---|
| Impatiens | Dazzler White | Raw | 4 | 7 | 25° C. | 11 | 96 | 17 |
| | | 2 ppm A-REST | 4 | 7 | | 11 | 96 | 13 |
| | | 4 ppm A-REST | 4 | 7 | | 11 | 94 | 11 |
| | | 8 ppm A-REST | 4 | 7 | | 11 | 99 | 9 |
| Marigolds | African Marvel Orange | Raw | 2 | 8 | 25° C. | 10 | 98 | 25 |
| | | 2 ppm A-REST | 2 | 8 | | 10 | 98 | 12 |
| | | 4 ppm A-REST | 2 | 8 | | 10 | 87 | 12 |
| | | 8 ppm A-REST | 2 | 8 | | 10 | 82 | 12 |

These data show that including a plant growth regulator in the water-soluble thermoplastic material results in the same response as without pelleting in the thermoplastic material.

Example 6

Casting with One Seed Providing Seed Additive to Other Seeds

Three seeds, two raw and one Ball Control Growth (BCG), were placed in every mold cavity of a mold containing 108 cavities of dimension of 0.25 inch (6.4 mm) in length by 0.125 inch (3.2 mm) in width and 0.125 inch (3.2 mm) in depth. For this experiment only 18 cavities were used to make casts, because pellets were sown in well plates containing 6 cells.

PEG 2000 was heated to 111° F. until the PEG 2000 completely melted, then 65 µl was pipetted into the cavities that contained the seeds. Once the selected number of mold cavities was filled, the mold was set aside to cool. The castings were then removed from the mold.

The castings (seeds plus PEG 2000) and a raw control were sown in a 6 well plate to evaluate germination. Seeds were sown at 25° C. The plates were run through a watering tunnel and then put into a Stage 1 mist chamber. Upon radical emergence, the plugs were placed in a Stage 2 chamber. The amount of time in Stage 1 and Stage 2 was dependent on the crop. Plant heights were measured by hand Results are presented in Table 6.

TABLE 6

| Crop | Variety | Treatment | Stage 1 Days | Stage 2 Days | Germ. Temp | Count Date | Germ. (%) | Ave. Height (mm) |
|---|---|---|---|---|---|---|---|---|
| Marigolds | African Marvel Orange | Raw | 2 | 7 | 25° C. | 9 | 100 | 25 |
|  |  | Cast only |  |  |  |  | 100 | 19 |
|  |  | 2 Raw w/1 BCG |  |  |  |  | 100 | 15 |
| Impatiens | Dazzler White | Raw | 4 | 5 | 25° C. | 9 | 100 | 11 |
|  |  | Cast only |  |  |  |  | 89 | 9 |
|  |  | 2 Raw w/1 BCG |  |  |  |  | 100 | 8 |

These data show that by including one seed treated with plant growth regulator in a cast multiseed pellet with non-treated seeds, the non-treated seeds responded to the plant growth regulator treatment as if they were treated directly.

Example 7

Casting with Multiple Active Ingredient Treatments (Prophetic Example)

Traditionally, pesticides and plant growth regulators are applied to seeds prior to sowing. These treatments can be delivered via a cast pellet as an application to seed before casting and as an addition to the casting substance. In the previous examples, it was demonstrated that results similar to traditional seed treatment were achieved by either including the active ingredient in the cast pellet, or by including a treated seed along with a non-treated seed in the same cast pellet.

It can be further demonstrated that two or three treatment methods can be used in combination as a means of applying an active ingredient. Illustrative treatments include insecticides, fungicides, bactericides plant growth regulators, fertilizers, and microorganisms. Release of active ingredients can be immediate or delayed. Representative treatment options for one active ingredient are presented in Table 7.

TABLE 7

| Treatment Method | % of Active Ingredient | | | |
|---|---|---|---|---|
| Application to seed before casting | 33 | 50 | 50 |  |
| Active ingredient within casting substance | 33 | 50 |  | 50 |
| Application to seeds included in cast pellet with non-treated seeds | 34 |  | 50 | 50 |
| Total | 100 | 100 | 100 | 100 |

Example 8

Casting with Multiple Active Ingredients (Prophetic Example)

For some plant species, it is common to treat seeds with multiple active ingredients. For example, seeds can be treated with a combination of fungicides having different modes of action. In addition, seeds can be treated with a combination of an insecticide and a fungicide, or a fungicide and a growth regulator. Treatment methods including the application of an active ingredient to seeds before casting, application of the active ingredient within the casting substance, and application of an active ingredient to seeds included in cast pellet with non-treated seed can be used to provide multiple combinations of treatment options. Illustrative treatments include combinations of insecticides, fungicides, bactericides plant growth regulators, fertilizers, and microorganisms. Release of active ingredients can be immediate or delayed.

Example 9

Casting in Polyvinyl Alcohol

Eight seeds of *Petunia* variety P.T. were placed in every mold cavity of a mold containing 108 cavities having dimensions of 6.4 mm×3.2 mm×3.2 mm (i.e., 0.25 inch×0.125 inch×0.125 inch). Next, 65 µl of polyvinyl alcohol (PVA; CELVOL 205, Sekisui Chemical Co. Ltd., Dallas, Tex.) was pipetted into the cavities in concentrations of 10%, 12.5%, 15%, 17.5%, and 20%. After filling, the molds were placed in a drying room with a relative humidity of 20% overnight. The castings were removed from the mold the following day.

The 108 castings and a production pelleted raw control were sown in a 108 plug flat to evaluate germination. Seeds were sown at 25° C. The plug trays were run through a watering tunnel and then put into a Stage 1 mist chamber for three days. Upon radical emergence, the plugs were placed in a Stage 2 chamber for seven days. Germination results are shown in Table 8, with day 10 being the count date. Pelleted raw seed was a commercial pelleted seed with one seed per pellet. Seeds in the PVA castings were considered germinated if four or more seedlings grew from the casting.

TABLE 8

| Crop/Variety | Treatment | Germination % |
|---|---|---|
| Petunia/P.T. | Pelleted Raw | 95 |
|  | 10% PVA | 100 |
|  | 12.5% PVA | 100 |
|  | 15% PVA | 80 |
|  | 20% PVA | 95 |

Germination results were the same or better for the 10% PVA, 12.5% PVA, and 20% PVA treatments as compared to the pelleted raw seed control. The 15% PVA treatment yielded only 80% germination as compared to 95% germination for the control, but this is probably a statistical anomaly since the 12.5% PVA and 20% PVA treatments yielded 100% and 95% germination rates, respectively. Therefore, germination rates of the treated seeds were as good as germination rates for the control.

Example 10

Casting with Glyceride

Twelve seeds of lettuce varieties Alfresco, City Garden, and Global Gourmet were placed in mold cavities of a mold containing 108 cavities having dimensions of 6.4 mm×3.2 mm×3.2 mm (i.e., 0.25 inch×0.125 inch×0.125 inch). Glyceride 43/01 (Gattefossé SAS, Saint Priest, France) was heated to 109° F. (42.8° C.) until it was completely melted. Next, 65 µl of the melted wax was pipetted into the cavities containing the seeds. After filling, the molds were set aside to cool and harden. The castings were then removed from the mold.

The 108 castings and a production pelleted control were sown in a 108 plug flat to evaluate germination. Seeds were sown at 25° C. The plug trays were run through a watering tunnel and then put into a Stage 1 mist chamber for two days. Upon radical emergence, the plugs were placed in a Stage 2 chamber for five days. Germination results are shown in Table 9, with day 7 being the count date. Seeds in the castings were considered germinated if six or more seedlings grew from the casting.

TABLE 9

| Crop/Variety | Treatment | Germination % |
|---|---|---|
| Lettuce/Alfresco | Production Pellet | 90 |
|  | 43-01 | 100 |
| Lettuce/City Garden | Production Pellet | 90 |
|  | 43-01 | 100 |
| Lettuce/Global Gourmet | Production Pellet | 97 |
|  | 43-01 | 100 |

Germination rates were 100% in each of the casting treatments, which was better than the results obtained with the production pellet controls.

Example 11

Multiseed and Vegetative Cutting Cast Pellet Combinations

In the horticultural industry it is common to sell containers holding a plurality of plants of either the same species or different species. The combination of different types of plants in a single container can provide for a pleasing combination of flower color and/or foliage. To prepare a multi-plant container, plants of either the same species or different species are placed together in a single container with sufficient soil and nutrients to sustain growth and/or flowering as finished plants.

Plants used in multi-plant containers are typically propagated from either vegetative cuttings or seeds. To produce multi-plant containers from vegetative products, cuttings of the same species or different species are rooted each in a separate growth cell, termed a liner, or rooted together in a single liner (U.S. Pat. No. 7,891,134). Depending on the size of the multi-plant container, rooted liners can be either planted directly into multi-plant containers or transplanted into larger pots for further growth, after which stage they can be transplanted into multi-plant containers. To produce multi-plant containers from seed products, seeds of the same species or different species can be germinated each in a separate growth cell, termed a plug, or germinated together in the same plug. Depending on the size of the multi-plant container, rooted plugs can be either planted directly into multi-plant containers or transplanted into a larger pot for further growth, after which stage they can be transplanted into multi-plant containers.

While multi-plant containers can be made from combinations of plants propagated from either vegetative cuttings or seeds, growers are limited to combining separate rooted liners and plugs, or plants at a later stage of development. Because of restrictions with timing cutting root initiation and seed germination rates, individual growth cells or liners having a combination of vegetative cuttings and seeds are not known in the art.

An illustrative embodiment of the present invention simplifies prior processes of producing separate plants in separate liners and plugs and later creating mixed-plant containers of a combination of the separate plants by transplanting them into a common container. This embodiment provides for more efficient growth and cultivation of different plants that avoids producing multiple plants in multiple growth cells and containers.

To produce a marketable multi-plant container derived from a multiseed cast pellet and vegetative cutting combination, it is desirable to control the seed germination rate so that it is synchronized with the time required for vegetative cutting root initiation. As used herein, "synchronized" means that cutting root initiation and seed germination occur within about 7 days of each other. For example, if root initiation of a cutting of a selected variety is known to occur in about 14 days, then seed germination of a variety to be planted with the cutting should occur within the period of about 7 days before to about 7 days after root initiation of the cutting. Thus, cutting root initiation and seed germination would also be synchronized if they occur within 6, 5, 4, 3, 2, 1, or 0 days of each other.

From preliminary studies, it was observed that an increased cast pellet size correlated with delayed seed germination rates. To determine the optimal cast pellet size for timing of seed germination, five molds having different cavity volume capacities were used. The different mold dimensions and capacities are presented in Table 10.

TABLE 10

| Mold | Cavities | Length, in. (mm) | Width, in. (mm) | Depth, in. (mm) | Volume (µl) |
|---|---|---|---|---|---|
| 1 | 90 | 0.25 (6.4) | 0.125 (3.2) | 0.125 (3.2) | 250 |
| 2 | 60 | 0.25 (6.4) | 0.25 (6.4) | 0.125 (3.2) | 300 |
| 3 | 48 | 0.375 (9.5) | 0.25 (6.4) | 0.125 (3.2) | 350 |

TABLE 10-continued

| Mold | Cavities | Length, in. (mm) | Width, in. (mm) | Depth, in. (mm) | Volume (μl) |
|---|---|---|---|---|---|
| 4 | 48 | 0.375 (9.5) | 0.375 (9.5) | 0.125 (3.2) | 550 |
| 5 | 48 | 0.375 (9.5) | 0.375 (9.5) | 0.25 (6.4) | 1,550 |

Seed varieties were selected based on commercial success in mixed container plantings. The number of seeds selected to be used per cast pellet was based on an estimated final plant size that would achieve an aesthetically pleasing mixed planting. For small seed such as *petunia* and *bacopa*, pelleted seed was used for the treatments and functioned only for ease of transferring the seeds into the cavities.

Varieties and number of seeds used per cast pellet included: *Petunia* SHOCK WAVE Denim—3 seeds; *Petunia* EASY WAVE Neon Rose—3 seeds; *Osteospermum* AKILA White—1 seed; *Bacopa* Snowtopia—3 seeds; *Talinum Limón*—2 seeds; and *Isotoma* Tristar Sky Blue—5 seeds.

The number of seeds per variety referenced above was transferred into the mold cavities to produce cast pellets having the following variety combinations:

*Petunia* SHOCK WAVE Denim with *Bacopa Snowtopia*;
*Petunia* EASY WAVE Neon Rose with *Talinum Limón*; and
*Osteospermum* AKILA White with *Isotoma* Tristar Sky Blue.

Polyethylene glycol with a molecular weight of 8000 was heated to 141° F. (60.6° C.) until the PEG 8000 completely melted, and then a sufficient volume was pipetted into the cavities containing the seeds. After the mold was filled, it was set aside to cool and harden. After cooling and hardening, the castings were removed from the mold.

To evaluate germination timing, 12 cast pellets from each of the plant variety combinations pelleted using each of the five molds, identified in Table 10 as numbers 1 through 5, were sown into plug tray having 72 openings. Controls of seeds not in cast pellets were used for each combination.

Germination was evaluated under both growth chamber and greenhouse conditions. Growth chambers were set to 20° C. or 25° C. depending on the seed crop sown. For both growth chamber and greenhouse conditions, typical industry misting practices were used.

In general for each variety combination under both germination conditions, germination was delayed with increased pellet size relative to control seeds not in cast pellets. Typically germination in growth chambers was further delayed when compared to seed germinated under greenhouse conditions. The results for the growth chamber germination conditions are presented in Table 11 and those for the greenhouse conditions in Table 12.

TABLE 11

| Pellet Combination | Varieties | Germination under Growth Chamber Conditions (days relative to control) Mold Number | | | | | |
|---|---|---|---|---|---|---|---|
| | | Control | 1 | 2 | 3 | 4 | 5 |
| 1 | *Petunia* SHOCK WAVE Denim | 0 | 0 | 1 | 6 | 6 | 6 |
| | *Bacopa* Snowtopia | 0 | 0 | 1 | 5 | 5 | 5 |
| 2 | *Petunia* EASY WAVE Neon Rose | 0 | 0 | 6 | 6 | 6 | 8 |
| | *Talinum Limón* | 0 | 0 | 6 | 6 | 6 | 8 |
| 3 | *Osteospermum* AKILA White | 0 | 0 | 2 | 4 | 4 | 4 |
| | *Isotoma* Tristar Sky Blue | 0 | 0 | 2 | 0 | 2 | 4 |

TABLE 12

| Pellet Combination | Varieties | Germination under Greenhouse Conditions (days relative to control) Mold Number | | | | | |
|---|---|---|---|---|---|---|---|
| | | Control | 1 | 2 | 3 | 4 | 5 |
| 1 | *Petunia* SHOCK WAVE Denim | 0 | 0 | 1 | 1 | 3 | 6 |
| | *Bacopa* Snowtopia | 0 | 0 | 1 | 1 | 3 | 6 |
| 2 | *Petunia* EASY WAVE Neon Rose | 0 | 0 | 1 | 3 | 3 | 3 |
| | *Talinum Limón* | 0 | 0 | 1 | 3 | 3 | 3 |
| 3 | *Osteospermum* AKILA White | 0 | 0 | 0 | 0 | 2 | 2 |
| | *Isotoma* Tristar Sky Blue | 0 | 0 | 0 | 0 | 2 | 2 |

These results show that the timing of seed germination can be modified by selecting the volume of the cast pellets used for planting the seeds.

Based on the above results, it was determined that mold number 3, having a cavity volume of 350 μl, provided optimal seed germination delay for variety combinations 1 (*Petunia* SHOCK WAVE Denim with *Bacopa Snowtopia*) and 2 (*Petunia* EASY WAVE Neon Rose with *Talinum Limón*). While mold number 4, having a cavity volume of 550 μl, was determined to provide optimal seed germination delay for variety combination 3 (*Osteospermum* AKILA White with *Isotoma* Tristar Sky Blue).

Vegetative cutting varieties were selected that had root initiation timing synchronized with the delayed seed germination timing. In addition, the varieties were selected to provide a marketable multi-plant container product. A single vegetative variety was added to the previously identified seed combinations as follows:

*Petunia* SHOCK WAVE Denim and *Bacopa Snowtopia* with vegetative *Angelonia* ANGEL MIST Lavender Improved;

*Petunia* EASY WAVE Neon Rose and *Talinum Limón* with vegetative *Bacopa* ABUNDA Colossal White; and

*Osteospermum* AKILA White and *Isotoma* Tristar Sky Blue with vegetative *Lobelia* WATERFALL Azure Mist.

Cast pellets were made as previously described in the size selected for each seed combination and were sown into a size-78 Ellepot (The Blackmore Company, Belleville, Mich.). The selected vegetative cutting was stuck into the same liner to produce each above identified vegetative variety seed combination. There were twelve samples per treatment. Controls of blank cast pellets in addition to controls of seeds not in a cast pellet were used. Trays were maintained under greenhouse germination conditions. Liners were transplanted to 6-inch pots after 25 days. At transplant it was determined that the cast pellet itself did not negatively affect root initiation of the cutting. After 21 days it was determined that all three vegetative cutting with cast pellet combinations yielded 100% mixed plantings with sufficient foliage growth derived from all seed and vegetative source material. Seeds not in a cast pellet germinated without a delay period.

The subject matter claimed is:

1. A method of producing a multi-plant product, the method comprising planting in a container (a) a cast pellet comprising a mixture of one or more plant seeds and a setable, flowable casting substance, and (b) an unrooted plant cutting, wherein the one or more plant seeds are selected for their seed germination timing, and the unrooted plant cutting is selected for having root initiation timing synchronized with the seed germination timing of the one or more plant seeds.

2. The method of claim 1 wherein seed germination timing is modified by selecting a volume of the cast pellet.

3. The method of claim 1 wherein the casting substance is selected from water-soluble thermoplastics, plasters, polyacrylamides or derivatives thereof, polyacrylic acids, melt processable starches, hard fats, waxes, polyvinyl alcohols, glycerides, partial glycerides, and mixtures thereof.

4. The method of claim 1 wherein the casting substance comprises a water-soluble thermoplastic.

5. The method of claim 4 wherein the thermoplastic comprises polyethylene glycol.

6. The method of claim 5 wherein the polyethylene glycol has a molecular weight of about 1,500 to about 20,000.

7. The method of claim 4 wherein the thermoplastic has a glass transition temperature of 35.0° C. or higher.

8. The method of claim 4 wherein the thermoplastic has a melting temperature of 65.6° C. or lower.

9. The method of claim 1 wherein the casting substance comprises plaster.

10. The method of claim 1 wherein the casting substance comprises polyacrylamide or a derivative thereof.

11. The method of claim 1 wherein the casting substance comprises polyacrylic acid.

12. The method of claim 1 wherein the casting substance comprises a melt processable starch.

13. The method of claim 1 wherein the casting substance comprises a hard fat.

14. The method of claim 1 wherein the casting substance comprises a wax.

15. The method of claim 1 wherein the casting substance comprises polyvinyl alcohol.

16. The method of claim 1 wherein the casting substance comprises a glyceride.

17. The method of claim 1 wherein the casting substance comprises a partial glyceride.

18. The method of claim 1 wherein the pellet comprises at least two plant seeds.

19. The method of claim 18 wherein the at least two plant seeds comprise seeds of one variety.

20. The method of claim 18 wherein the at least two plant seeds comprise seeds of at least two different varieties of the same species.

21. The method of claim 18 wherein the at least two plant seeds comprise seeds of at least two different species.

* * * * *